(12) United States Patent
Okuyama et al.

(10) Patent No.: US 10,493,684 B2
(45) Date of Patent: Dec. 3, 2019

(54) COMPOSITE CONTAINER MANUFACTURING METHOD, MOLDING DIE, AND COMPOSITE CONTAINER

(71) Applicant: DISCMA AG, Hunenberg (CH)

(72) Inventors: Yuichi Okuyama, Kanagawa (JP); Nobuyuki Tamura, Kanagawa (JP); Toshimasa Tanaka, Kanagawa (JP)

(73) Assignee: DISCMA AG, Zürich (CH)

( * ) Notice: Subject to any disclaimer, the term of this patent is extended or adjusted under 35 U.S.C. 154(b) by 251 days.

(21) Appl. No.: 15/315,311

(22) PCT Filed: Apr. 16, 2015

(86) PCT No.: PCT/JP2015/002106
§ 371 (c)(1),
(2) Date: Nov. 30, 2016

(87) PCT Pub. No.: WO2015/182033
PCT Pub. Date: Dec. 3, 2015

(65) Prior Publication Data
US 2017/0203492 A1 Jul. 20, 2017

(30) Foreign Application Priority Data
May 30, 2014 (JP) .................. 2014-113410

(51) Int. Cl.
*B29C 49/24* (2006.01)
*B29C 49/06* (2006.01)
(Continued)

(52) U.S. Cl.
CPC .......... *B29C 49/2408* (2013.01); *B29C 49/06* (2013.01); *B29C 49/08* (2013.01);
(Continued)

(58) Field of Classification Search
None
See application file for complete search history.

(56) References Cited

U.S. PATENT DOCUMENTS 4,863,046 A * 9/1989 Collette .............. B29C 49/0073
215/381
4,983,348 A * 1/1991 Barresi ............... B29C 49/2408
264/509
(Continued)

FOREIGN PATENT DOCUMENTS

| JP | 2000-043129 A | 2/2000 |
| JP | 2000-313443 A | 11/2000 |

(Continued)

*Primary Examiner* — Monica A Huson
(74) *Attorney, Agent, or Firm* — Eric J. Sosenko; Jonathan P. O'Brien; Honigman LLP

(57) ABSTRACT

A method of manufacturing a composite container. The method includes providing a paper label, and a preform; providing a molding die equipped with a closed, cylindrical lower mold and an upper mold composed of a plurality of split-mold segments; arranging the paper label in the lower mold; arranging the preform between opened split-mold segments; moving one or both of the lower mold with the paper label and the upper mold with the preform in a direction towards each other to close the molding die; implementing blow-molding on the preform in the molding die; and opening the molding die to release the composite container.

13 Claims, 9 Drawing Sheets

(51) Int. Cl.
  *B29C 49/08*  (2006.01)
  *B29K 23/00*  (2006.01)
  *B29K 105/00*  (2006.01)
  *B29L 31/00*  (2006.01)
  *B29C 49/48*  (2006.01)

(52) U.S. Cl.
  CPC ...... *B29C 49/24* (2013.01); *B29C 2049/2412* (2013.01); *B29C 2049/2495* (2013.01); *B29C 2049/4887* (2013.01); *B29C 2049/4894* (2013.01); *B29K 2023/12* (2013.01); *B29K 2105/258* (2013.01); *B29L 2031/712* (2013.01)

(56) References Cited

U.S. PATENT DOCUMENTS

| | | | |
|---|---|---|---|
| 2004/0224049 A1 | 11/2004 | Chang | |
| 2005/0206045 A1* | 9/2005 | Desanaux | B29C 49/46 264/535 |
| 2006/0065992 A1* | 3/2006 | Hutchinson | B29C 43/08 264/45.1 |
| 2010/0001010 A1* | 1/2010 | Motegi | B29C 49/2408 220/694 |

FOREIGN PATENT DOCUMENTS

| | | |
|---|---|---|
| JP | 2005-169710 A | 6/2005 |
| JP | 2011-116082 A | 6/2011 |
| JP | 2012-096831 A | 5/2012 |
| WO | 2013/089054 A1 | 6/2013 |

\* cited by examiner

COMPOSITE CONTAINER MANUFACTURING METHOD, MOLDING DIE, AND COMPOSITE CONTAINER

CROSS-REFERENCE TO RELATED APPLICATIONS

This application is the U.S. national phase of PCT Application No. PCT/JP2015/002106 filed on Apr. 16, 2015, the disclosure of which is incorporated in its entirety by reference herein.

TECHNICAL FIELD

The present invention relates to a synthetic resin container body that holds content, and a composite container equipped with a paper label mounted to a trunk of the container body, and more particularly to a composite container manufacturing method, a molding die used to shape the composite container, and a composite container formed by the manufacturing method or the molding die.

BACKGROUND ART

Efforts have been made to make a thin composite resin-made container body to protect the environment and reduce costs. As an example, disclosed in Japanese Unexamined Patent Application No. 2000-313443 is a composite container that supplements rigidity of the container body reduced by being thinner, using a cylindrical paper label, in other words, a paper cylinder that covers the trunk of the container body.

Conventionally, this kind of composite container is made by forming the container body, then covering the container body with a separately made paper cylinder; it can take hours to combine the two so a limit has come to cost reductions.

However, as disclosed in Japanese Unexamined Patent Application Publication No. 2011-116082, it is common for this kind of container body to be made by moving a preform P in a lateral direction (horizontal direction) to a two-piece, split-mold blow molding die BM that opens and closes by rocking, and blow molding after closing the mold.

SUMMARY OF THE INVENTION

Here, it is possible to combine the container body and the paper cylinder in the blow molding die BM if blow molding is implemented after setting the paper cylinder in the blow molding die BM. However, it is necessary to arrange the preform P at an inside of the paper cylinder so with the conventional method to move in the lateral direction, it is impossible to arrange the preform P in the blow molding die BM.

It has been considered to avoid interfering with the preform P moved in the lateral direction by using a low-height paper cylinder, or by disposing a notch in a portion of the paper cylinder, and arranging this notch in the blow molding die BM to be positioned in the movement trajectory of the preform P. However, with these methods, the height of the paper cylinder is low overall, or partially, so the effect of supplementing container body rigidity fades.

Conversely, a method was considered to move the preform P from above to the blow molding die BM, but in such a case, it is necessary widely to open the blow molding die BM in the lateral direction to avoid interfering with the preform P, so the installation area of the die required to open the mold must be larger, which makes the system larger.

The present invention solves these kinds of problems. An object of the present invention is to provide a new composite container manufacturing method, molding die, and a composite container formed using the manufacturing method, or the molding die, by assembling the container body and the paper label in the molding die, to eliminate the labor required for assembly, reduce costs, attain adequate rigidity, and whose die installation area fits in a way that is equivalent to conventional ones.

MEANS FOR SOLVING THE PROBLEM

To manufacture a composite container mounted with a paper label on the trunk, the present invention is a composite container manufacturing method that prepares a paper label and a preform, and prepares a molding die equipped with a closed, cylindrical lower mold, and an upper mold composed of a plurality of split-mold segments; next, in addition to arranging the paper label in the lower mold, arrange the preform from a direction that intersects an axis of the lower mold, between the mold-opening split-mold segments, and thereafter move one or both of the lower mold arranged with the paper label, and the upper mold arranged with the preform in a direction towards each other. After that, implement blow-molding on the preform by closing a molding die, then opening the molding die to release the composite container from the molding die.

The paper label is preferred to be formed into a paper cylinder.

It is preferable that the mold above has a pair of split-mold segments, and that the split-mold segments are relatively positioned to open and to close the mold centering on a pivot shaft along an axis of the lower mold.

It is preferable that the lower mold rises along the lower mold axis to the upper mold arranged with a preform, in a state arranged with the paper label.

It is preferable that an inner circumference face of the lower mold is a tapered face whose diameter narrows toward the bottom face of the lower mold.

It is preferable that a pressurizing medium that is used in blow molding is a content fluid filled last into the composite container.

Also, the present invention is a molding die that is used to form a composite container with a paper label mounted on the trunk, the molding die equipped with a closed, cylindrical lower mold arranged with a paper label at an inside thereof, and an upper mold composed of a plurality of split-mold segments, arranged with a preform from a direction that intersects the axis of the lower mold between the mold opening split-mold segment.

The paper label is preferred to be formed into a paper cylinder.

The present invention is a composite container manufacturing method or a composite container formed by the molding die described above.

According to the composite container manufacturing method of the present invention, it is possible to combine a paper label arranged in a molding die, and a container body that is formed by blow molding a preform, in the molding die, so it is possible to avoid the labor required until now for assembly and to reduce costs. Also, even when the paper label is formed into a paper cylinder, it is unnecessary to make the height of the paper cylinder lower overall, or partially, and it is possible to cover the entire trunk of the container body with the paper cylinder, so this maintains the effect of supplementing rigidity of a thinner container body. Also, the die installation area required for opening the mold fits in a way that is equivalent to a conventional way, because the preform is arranged in a direction that intersects the lower mold axis, between the opened split-mold segments.

The cost of the molding die is reduced because the upper mold structure is simplified, so it is possible to suppress the costs for manufacturing the composite container, when the upper mold is composed of a pair of split-mold segments, and the split-mold segments are relatively displaced to open and to close the mold centering on a pivot shaft along an axis of the lower mold.

When raising the lower mold arranged with the paper label to the upper mold arranged with a preform along an axis thereof, the height of the preform does not change along with the upper mold, so when blow molding, it is not necessary to change the position of the blow nozzle that injects pressurizing medium into the preform along with the movement of the paper label, so the molding apparatus structure can be simplified.

If the inner circumference face of the lower mold is a tapered face whose diameter narrows toward the bottom face of the lower mold, it is possibility easily to separate the composite container from the molding die.

If the pressurizing medium used in blow molding is content fluid filled last into the composite container, it is possible to promote simultaneous molding of the container body and the filling of the content fluid, so it is possible to reduce the cost of the composite container filled with content fluid.

DESCRIPTION OF THE PREFERRED EMBODIMENTS

The composite container according to the present invention, a molding die, and a manufacturing method for the composite container will now be described with reference to the drawings. Note that in the specifications, the scope of patent claims, and the abstract, "upper" is a side where a mouth is positioned for a bottom of the composite container; "lower" is an opposite side.

Figure 1:
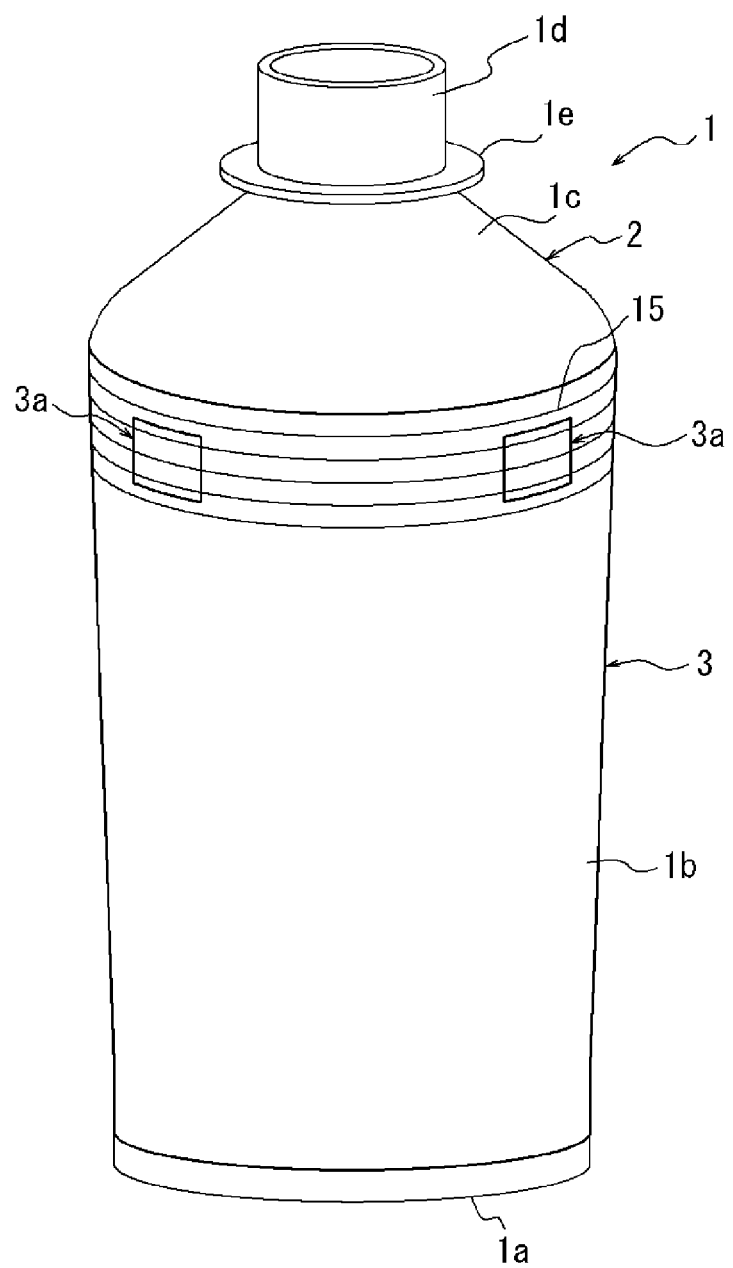
FIG. 1 is a perspective view of an embodiment of a composite container pursuant to the present invention.
Figure 2:
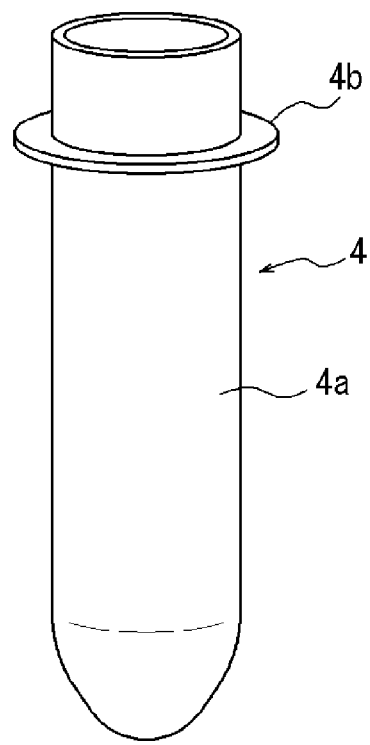
FIG. 2 is a perspective view of a preform used in forming the composite container shown in FIG. 1.

Reference numeral 1 in FIG. 1 denotes one embodiment of the composite container according to the present invention. Composite container 1 combines a synthetic resin container body 2 and a paper cylinder 3 that covers the container body 2. In other words, the paper label in this embodiment is formed into a paper cylinder 3. As depicted in FIG. 2, the container body 2 is attained by blow molding a preform 4 (with this embodiment, equipped are the body 4a that is a test-tube shaped, and a circular neck ring 4b that projects toward an outside in the diameter direction from an outer circumference of the body 4a). When blow molded, the preform 4 combines with the paper cylinder 3 arranged inside the molding die 10 described below.

In this embodiment of the present invention, the composite container 1 shown in FIG. 1 is equipped with a circular bottom 1a, a circular trunk 1b that is joined to an outer edge of the bottom 1a, a shoulder 1c joined at a top edge of the trunk 1b, whose diameter narrows toward a top end, a circular mouth 1d joined to a top edge of the shoulder 1c, and a circular neck ring 1e that projects radially outwardly from an outer circumference of the mouth 1d. It is acceptable for the trunk 1b to be substantially the same diameter in the upward and downward directions, but in this embodiment, this is formed with the diameter narrowing slightly toward the bottom 1a.

Also, the paper cylinder 3 disposed on the composite container 1 extends from near a bottom edge of the trunk 1b to an upper end of the trunk 1b, and covers substantially the entire body excluding a portion of the bottom edge of the trunk 1b. Also, particularly the trunk of the container body 2 is thin; although the rigidity of that itself is low, the rigidity of the composite container 1 is adequately ensured for practical use by the paper cylinder 3 that covers substantially the entire body of the trunk 1b. Furthermore, in a case shown in the drawing, the paper cylinder 3 is constituted for its bottom end to be positioned slightly above the bottom end of the trunk 1b, not covering a portion of the bottom end of the trunk 1b. However, it is acceptable for the paper cylinder 3 to cover the entire body of the trunk 1b by matching the bottom edge of the paper cylinder 3 with the bottom edge of the trunk 1b.

Figure 3:
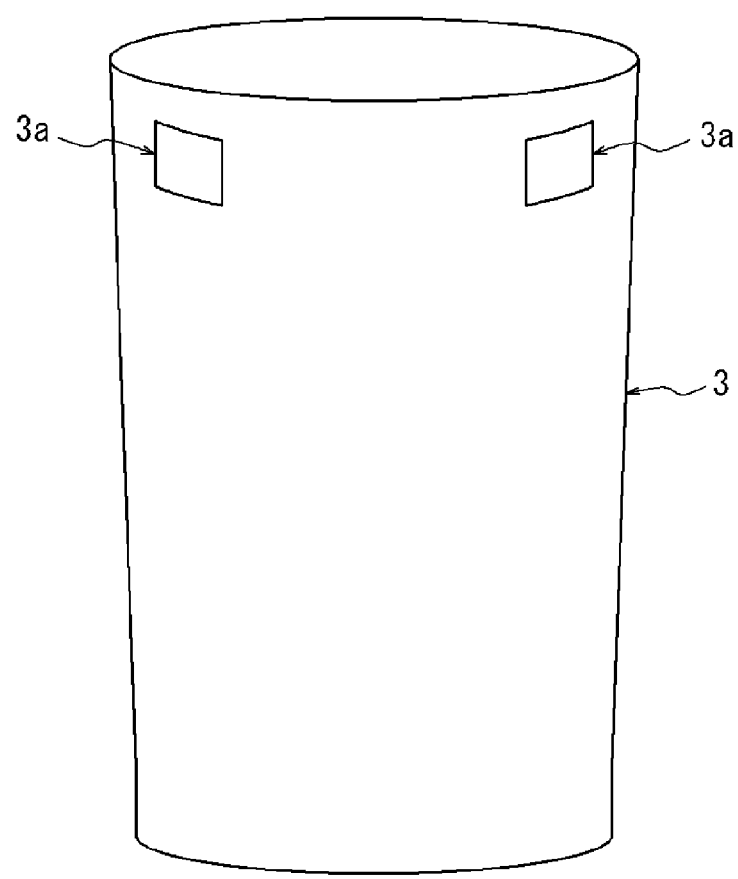
FIG. 3 is a perspective view of a paper cylinder for the composite container shown in FIG. 1.

As shown in FIGS. 1 and 3, the paper cylinder 3 is equipped with square window holes 3a at portions positioned toward a top end of the trunk 1b. In this embodiment, a total of four window holes 3a are disposed at equal distances in the circumference direction. This makes it possible to view the content of the composite container 1 through the window holes 3a. Also, the container body 2 projects radially outward at window holes 3a, an amount that is equivalent to the thickness of the paper cylinder 3 so the paper cylinder 3 will not easily fall from the composite container 1.

Figure 4:
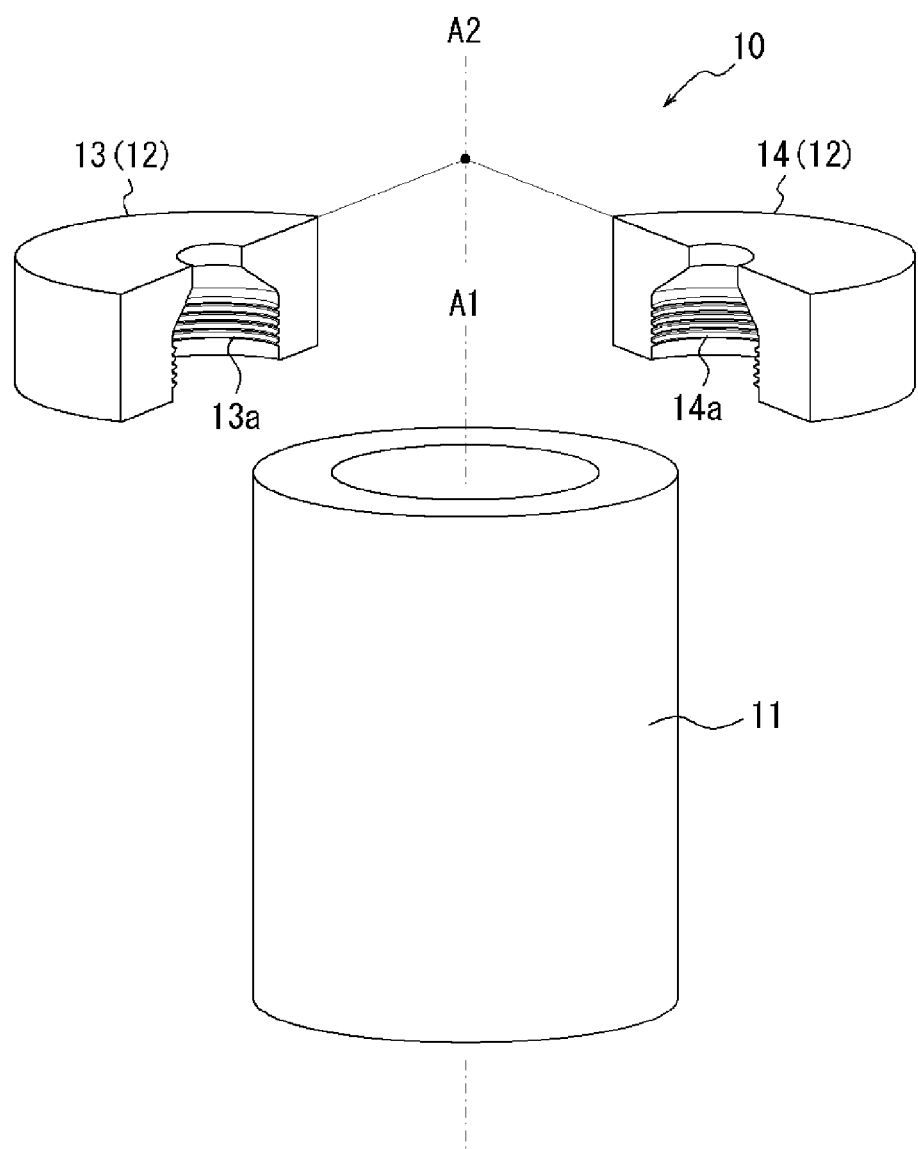
FIG. 4 is a schematic view of a molding die used to form the composite container shown in FIG. 1.

Also, the composite container 1 with this kind of constitution can be formed by the molding die 10 shown in FIG. 4. The molding die 10 is equipped with a closed, cylindrical lower mold 11, and an upper mold (12) composed of a plurality of split-mold segments. The bottom 1a of the composite container 1, and a bottom of the trunk 1b are formed by the lower mold 11; an upper portion of the trunk 1b, the shoulder 1c, and a portion of the mouth 1d are formed by the upper mold 12.

The upper mold 12 includes a pair of split-mold segments 13, 14. These split-mold segments 13, 14 relatively displace to a mold-opening state and a mold-closing centered on a pivot axis A2 along an axis A1 of the lower mold 11. (It is acceptable if only one of the split-mold segments 13, 14 pivots toward the other, or for both to pivot toward the other member.) Also, in order to displace the split-mold segments 13, 14 to the mold-opening state or the mold-closing state, it is possible to adopt a structure that displaces these in a straight-line trajectory by mounting the split-mold segments 13, 14 on a straight-line guard rail, for example, in addition to the constitution described in this embodiment. Furthermore, it is possible for a constitution having three or more split-mold segments.

Figure 5:
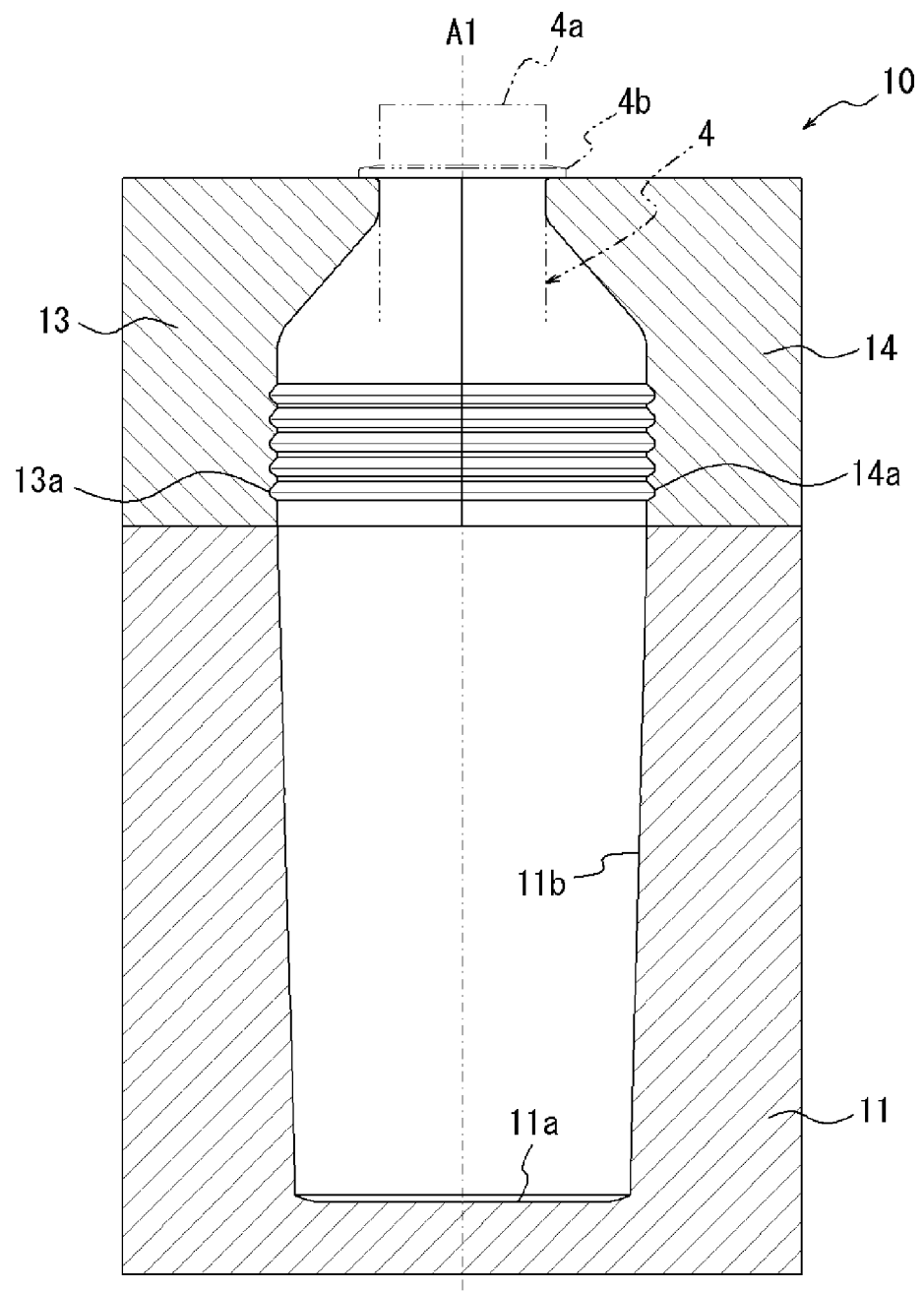
FIG. 5 is a sectional view of the molding die shown in FIG. 4 and defining an inner face shape of the composite container.

As shown in FIG. 5, an inner face of the molding die 10 is formed into a shape along the outer shape of the composite container 1. The inner circumference face of the lower mold 11 in this embodiment, is formed as a tapered face 11b whose diameter narrows toward a bottom face 11a of the lower mold 11. Also, a plurality of grooves 13a, 14a that extends in the circumferential direction is disposed at a position that corresponds to window holes 3a in the paper cylinder 3, at the inner circumference face of the split-mold segments 13, 14.

Next, a manufacturing method of the composite container 1 that uses the molding die 10 will be described with reference to FIG. 6.

Firstly, as shown at (a), the paper cylinder 3 is inserted into the lower mold 11 from above. Furthermore, as shown at (b), the preform 4 is moved along a direction (lateral direction) that intersects axis A1 of the lower mold 11, and arranges it between the mold-opening position of the split-mold segments 13, 14. Also, the paper cylinder 3 and the preform 4 are automatically moved to their predetermined positions relative to the lower mold 11 and the split-mold segments 13, 14 by transfer means omitted from the drawings. Also, the preform 4 can be preheated to a temperature that is suitable for blow molding.

Next, the lower mold 11 arranged with the paper cylinder 3, and one or both of the split-mold segments 13, 14 arranged with the preform 4 move in a direction to approach each other. As shown at (c), with this embodiment, the lower mold 11 arranged with the paper cylinder 3 is raised to a predetermined height toward the preform 4 arranged between the split-mold segments 13, 14, and positions the preform 4 inside the paper cylinder 3. Also, it is possible to lower the preform 4 and the split-mold segments 13, 14 toward the lower mold 11 arranged with the paper cylinder 3, but in line with this lowering, it is necessary to lower a blow-nozzle, described below, so it is preferable to adopt the structure of this embodiment that simplifies the forming apparatus structure.

Thereafter, as shown at (d), the molding die 10 is closed (displace the split-mold segments 13, 14 to a mold-closing state, and closely adhere the lower mold 11 and the split-mold segments 13, 14), the blow-nozzle (not shown in the drawings) is moved to contact to the upper opening of the preform 4, and a compressed pressurizing medium is supplied from the blow-nozzle to inside the preform 4. This extends the preform 4 thereby shaping the container body 2 along the inner face of the molding die 10. This pressure medium may be a gas or a liquid. In this embodiment, the preform 4, which is injection molded from a polypropylene resin, is subjected to biaxial stretch blow molding implemented by using content that is fluid filled into the composite container 1 as the pressurizing medium. This simultaneously molds the container body 2 and fills the content fluid, and is reinforced by the paper cylinder 3, so it is possible to make the container thin, using polypropylene formed by the biaxial stretching blow molding. Also, when using a liquid (content fluid) as the pressurizing medium, a water hammer generated when starting or stopping the filling of this fluid applies high pressure, particularly onto the bottom of the container body 2 and the trunk. For that reason, with blow molding that splits the entire region from the bottom, to the trunk, shoulder, and mouth into two, there is concern that the mold will be opened by the water hammer while blow molding. The present invention uses a closed, cylinder lower mold 11 so that this kind of problem does not occur.

Also, a plurality of grooves 13a, 14a are disposed in the inner faces of the split-mold segments 13, 14 as shown in FIG. 5, and extend in the circumferential direction. For that reason, the stretched preform 4 particularly presses against the paper cylinder 3 locally at the portion equipped the grooves 13a, 14a. As shown in FIG. 1, circular-shaped horizontal ribs 15 (only one horizontal rib is suitably assigned a symbol in the drawing) are formed along the grooves 13a, 14a in the container body 2 resulting from the preform 4, and in the paper cylinder 3, so it is possible to prevent the paper cylinder 3 from coming off of the container body 2 by increasing the adherence of the container body 2 and the paper cylinder 3. Furthermore, the window holes 3a are disposed in the paper cylinder 3 so the stretched preform 4 projects outward from the window holes 3a in the radial or diameter direction. For that reason, it is possible fit the paper cylinder 3 and container body 2 together at the window holes 3a. Therefore, an adhesive or the like is not necessary; this will not adhere by adhesive when separating garbage in a household so it is easy to sort plastic and paper.

Also, the split-mold segments 13, 14 can also be constituted without being equipped without the grooves 13a, 14a. In such a case, the composite container 1 is constituted without disposing a horizontal rib 15. Also, a constitution that does not provide the paper cylinder 3 with window holes 3a is possible.

Figure 6:
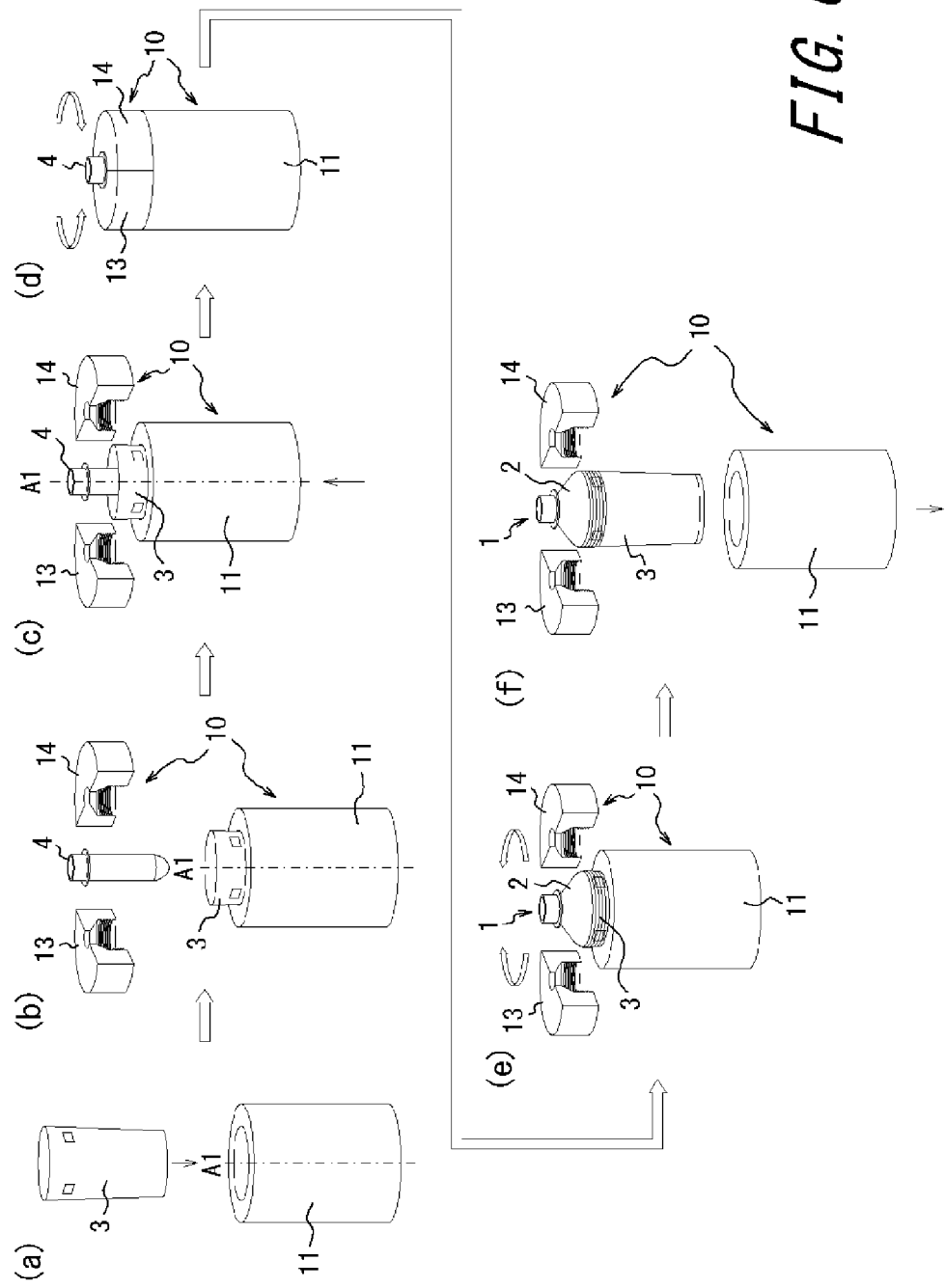
FIG. 6 is an illustrative drawing showing a manufacturing method for the composite container shown in FIG. 1, in a stepwise order of (a) to (f)

Thereafter, as shown at (e) in FIG. 6, the molding die 10 is opened (separating the lower mold 11 and the split-mold segments 13, 14 and displacing the split-mold segments 13, 14 to the open state), and as shown at (f) in FIG. 6, the composite container 1 is separated from the molding die 10, and in particular the lower mold 11. Here, as shown in FIG. 5, the tapered face 11b is disposed to narrow the diameter toward the bottom face 11a, so it is easy to separate the lower mold 11 from the composite container 1.

The present invention is not limited to the embodiment described above; various changes are possible within a range that conforms to the scope of the claims. For example, the order of each of the processes described with reference to FIG. 6 may be varied. A suitable plurality of process can be implemented simultaneously, or they may be switched. Furthermore, the outer shape of the composite container 1 is not limited to a round shape. A square or other shape is also acceptable.

Also, the grooves 13a, 14a disposed in the inner circumference face of the split-mold segments 13, 14 can also be disposed at a variety of positions in the molding die 10. For example, it is acceptable to dispose them near the bottom end of the paper cylinder 3, or near the top end (near a bottom edge of the shoulder 1c) of the paper cylinder 3.

Figure 7:
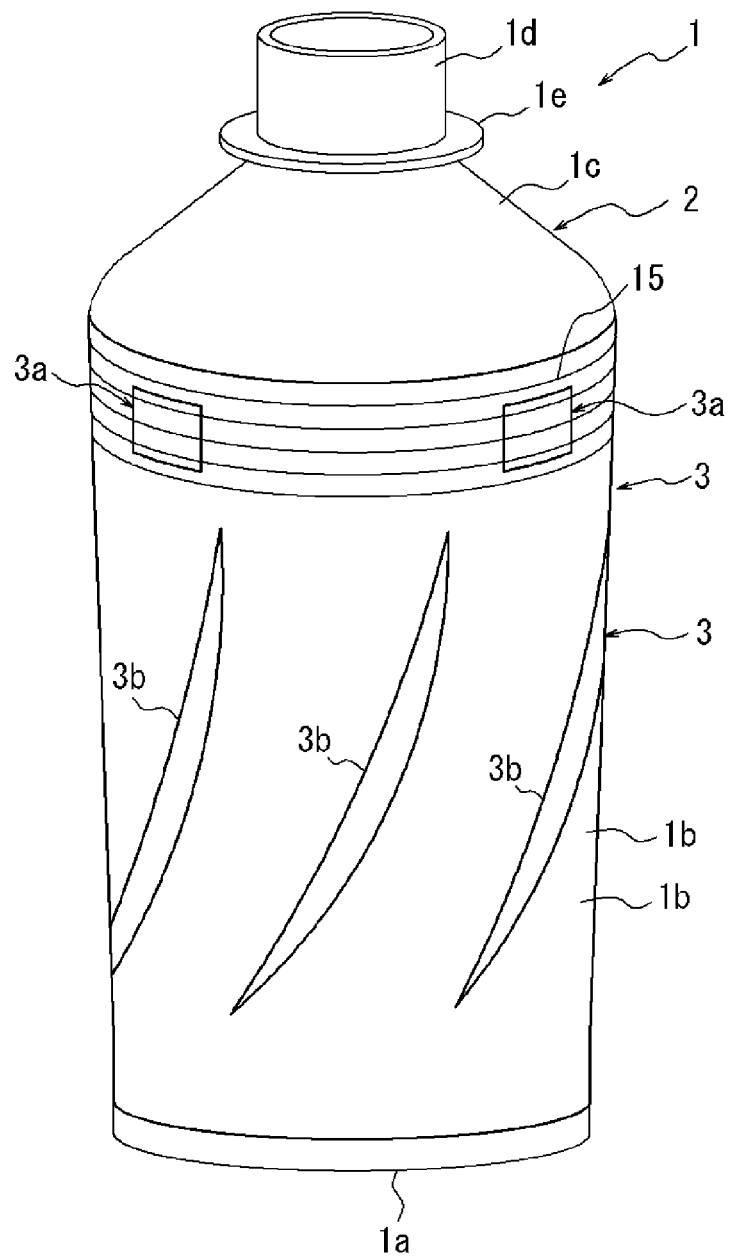
FIG. 7 is a perspective view of another embodiment of a composite container pursuant to the present invention.
Figure 8:
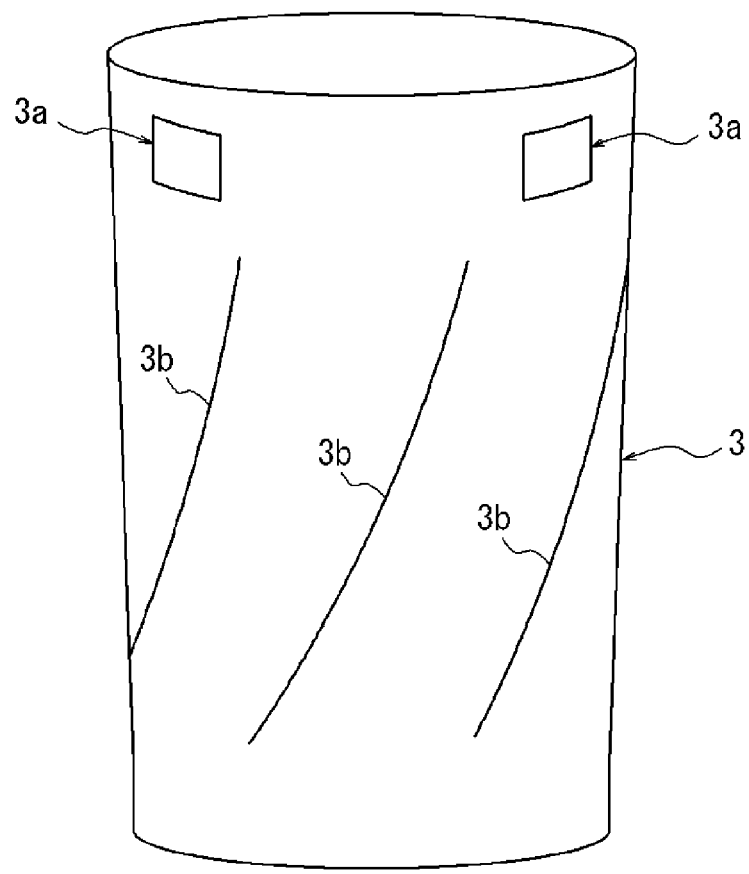
FIG. 8 is a perspective view of a paper cylinder for the composite container shown in FIG. 7.

Also, as shown in FIGS. 7, and 8, it is acceptable to dispose a plurality of slits 3b in the paper cylinder 3. In such a case, the paper cylinder 3 more easily follows the inner face of the molding die 10 as the slits 3b widen during blow molding, so it is difficult for undesired variations to be generated in the shape of the composite container 1, and adherence of the container body 2 and the paper cylinder 3 is increased.

Figure 9:
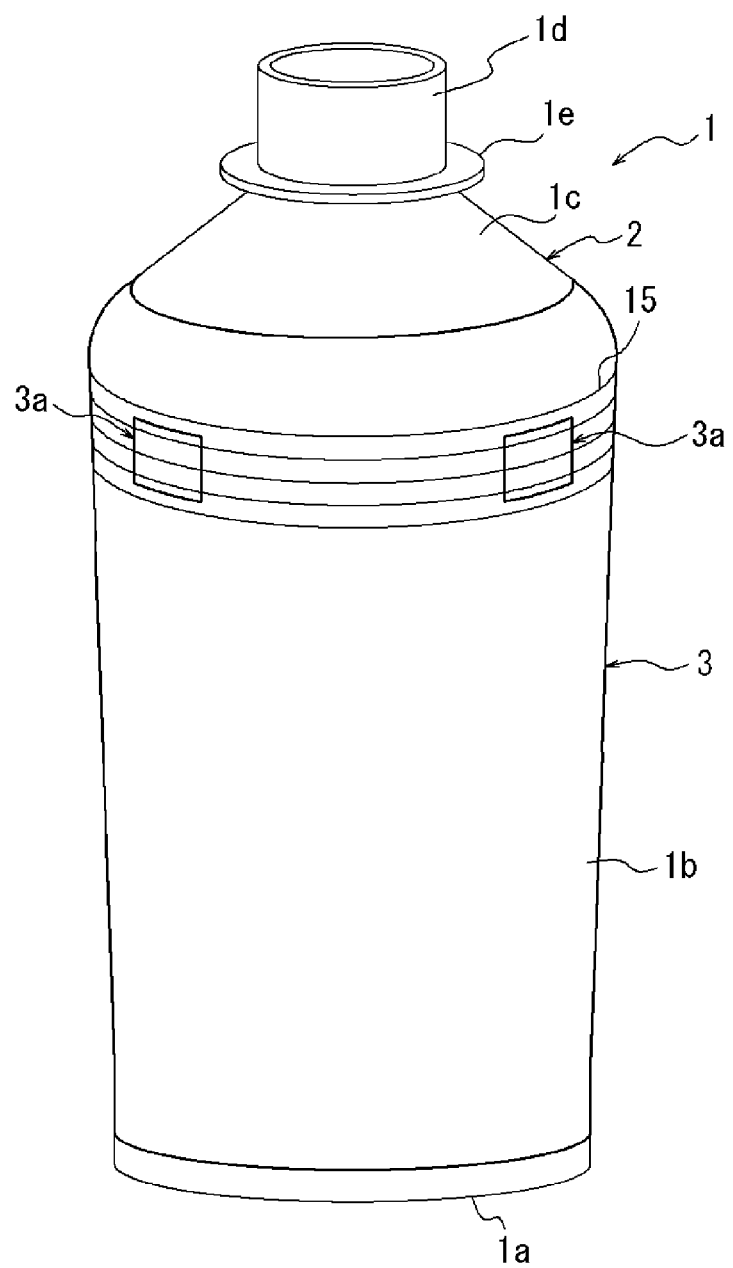
FIG. 9 is a perspective view of still another embodiment of a composite container pursuant to the present invention.

Still further, the range of the paper cylinder 3 covering the container body 2 can be suitably selected. For example, as shown in FIG. 9, the paper cylinder 3 can be constituted to cover a portion of the lower side of the shoulder 1c, not the entire body of the trunk 1b. In such a case, it is possible for a configuration of the paper cylinder 3 to include seams, that extend from the top end toward the bottom end, at the portion of the paper cylinder 3 where it covers the shoulder 1c and in a plurality of positions around the circumference. Also, it is acceptable for the paper cylinder 3 to cover only a portion of the trunk 1b of the container body 2.

Still further, with the embodiment described above, a description was given to form the paper label into a circular shaped paper cylinder 3. However, the shape of the paper label is not particularly limited to that. For example, it is acceptable to use another shape, such as a sectional arc-shape (a sectional C-shape).

The present invention assembles a container body and paper cylinder in a molding die, so it saves the labor required for assembly and reduces cost. It is possible to provide a new composite container manufacturing method, a molding die and a composite container.

The invention claimed is:

1. A method of manufacturing a composite container mounted with a label on a trunk, the method comprising:
   providing the label and a preform, and providing a molding die having a first mold for molding an upper part of the composite container and a second mold for molding a lower part of the composite container, the first mold including a plurality of split-mold segments;
   arranging the label in the second mold, and arranging the preform between the split-mold segments of the first mold;
   after arranging the label and the preform, closing the molding die, closing of the molding die including moving one of the split-mold segments in a first direction toward the other of the split-mild segments, closing of the molding die also including moving one of the first mold and the second mold in a second direction toward the other of the first mold and the second mold, the first direction being different from the second direction;
   blow molding the preform in the closed the molding die; and
   opening the molding die removing the composite container from the molding die.

2. The composite container manufacturing method according to claim 1, wherein the label is provided in the form of a cylinder.

3. The composite container manufacturing method according to claim 1, wherein the split-mold segments pivot open and close about a pivot shaft and center relative to the second mold along a central axis of the second mold.

4. The composite container manufacturing method according to claim 1, wherein during closing of the molding die, the second mold is moved along a central axis of the second mold and engages the first mold arranged with a preform.

5. The composite container manufacturing method according to claim 1, wherein an inner circumferential face of the second mold is tapered has a diameter narrowing in a direction toward a bottom face of the second mold.

6. The composite container manufacturing method according to claim 1, wherein, during the blow molding step, a molding medium of an incompressible fluid is used and filled into the composite container.

7. A molding die for forming a composite container provided with a paper label on a trunk, the molding die comprising:
   a second mold in the form of a unitary closed cylinder and having a label arranged on an inside thereof, the second mold defining a central axis, and a first mold, the first mold including a plurality of split-mold segments, the split mold segments arranged to receive a preform between the split mold segments from a direction that laterally intersects the central axis of the second mold.

8. The molding die according to claim 7, wherein the label is in the form of a cylinder.

9. A composite container formed in the molding die according to claim 7.

10. A composite container formed by the manufacturing method of claim 1.

11. The composite container manufacturing method of claim 1, wherein the second mold is a closed cylinder.

12. The composite container manufacturing method of claim 1, wherein during the arranging of the preform between the split-mold segments, the preform is moved from a direction that laterally intersects a central axis defined by the second mold.

13. The composite container manufacturing method according to claim 1, wherein the first direction is perpendicular to the second directions.

* * * * *